Figure 1:
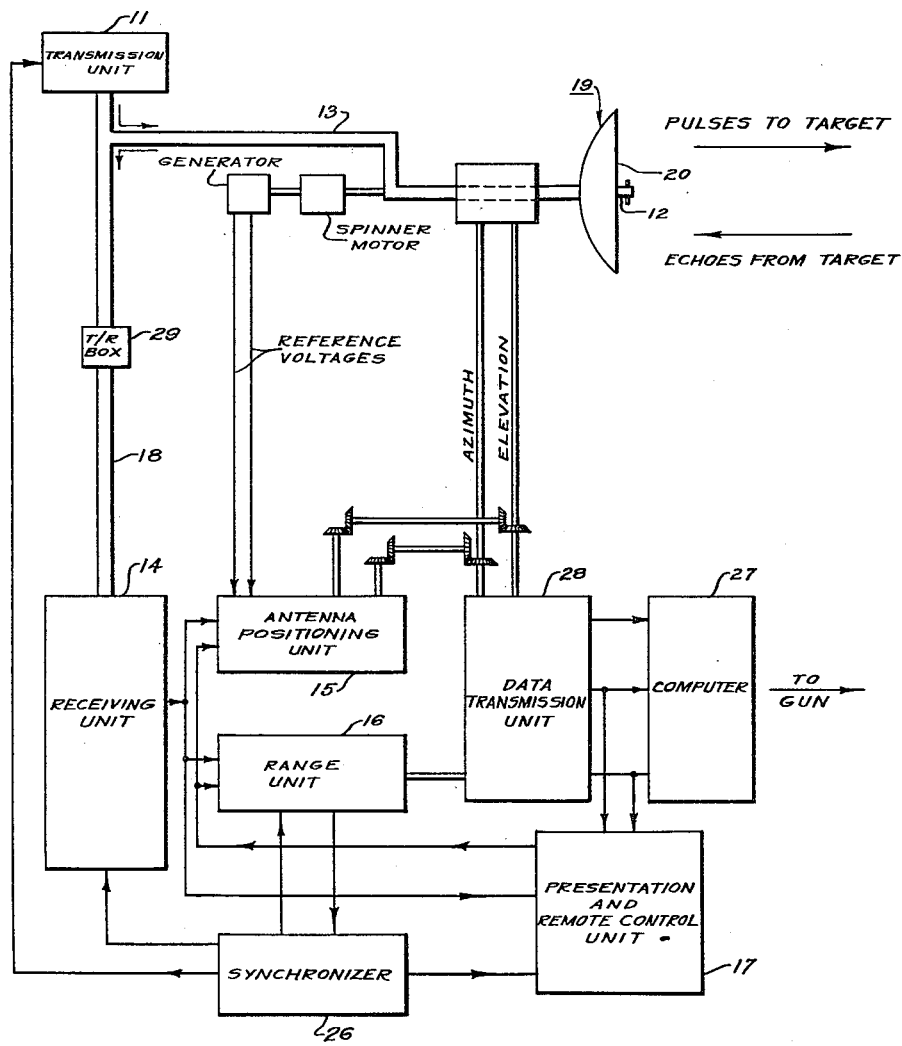

INVENTOR
JOSEPH H. LANCOR, JR.
BY
ATTORNEY

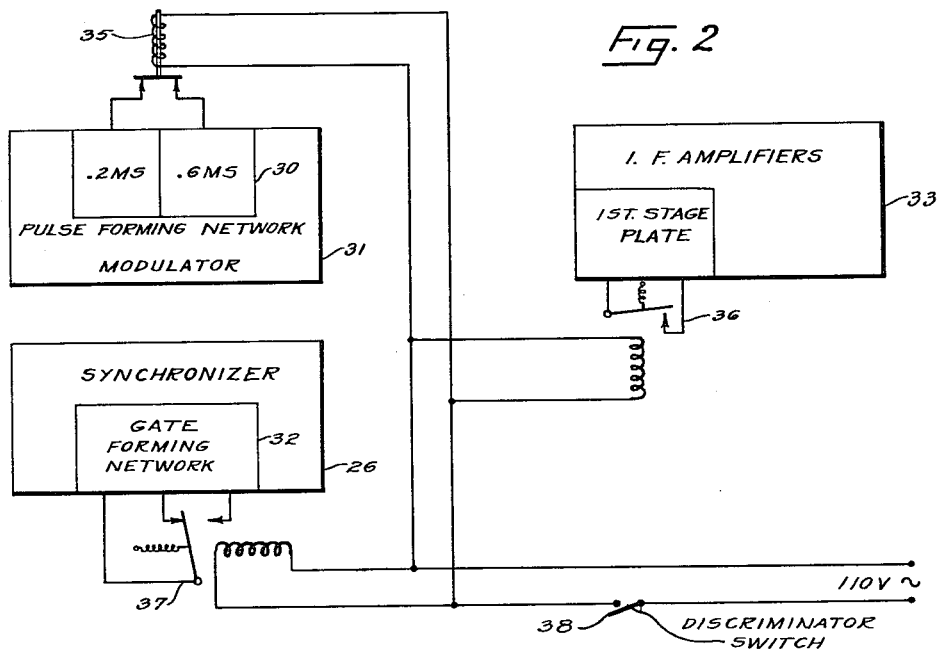
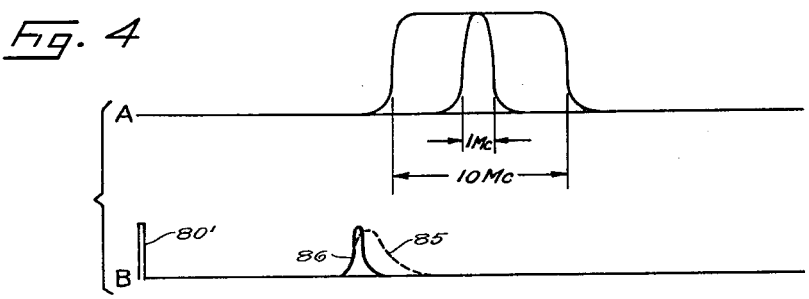

United States Patent Office 3,008,139
Patented Nov. 7, 1961

3,008,139
OBJECT DETECTING AND LOCATING SYSTEM
Joseph H. Lancor, Jr., East Williston, N.Y., assignor to Sperry Rand Corporation, a corporation of Delaware
Filed Jan. 18, 1946, Ser. No. 641,912
5 Claims. (Cl. 343—17.1)

This invention relates generally to object detecting and tracking systems and, more particularly, to apparatus and/or methods used therein to reduce interference signals in the operation of such systems.

Accordingly, the present invention is concerned with increasing the efficiency of a pulse radar tracking and detecting system by reducing unwanted radio signals caused by electromagnetic radiation arising from sources external to the pulse radar system itself and to the object being detected.

Such interference problems broadly result from three general types of radio interference, disturbance or "jamming."

The first type of interference results from the geometry of the physical surroundings near the radar set. Such interference is usually caused by the reflection of pulses of electromagnetic energy from extensive land masses, i.e., mountains, clouds or surfaces of water. This type of interference is commonly known to those skilled in the art as "clutter" or "grass."

The second type of interference is premeditatedly initiated by an enemy radiating pulses of energy simulating reflected pulses at a frequency akin to that of the pulse radar system. Such interference may be generated by the haphazard distribution of packets of shredded tinfoil known to those skilled in the art as "windows." Usually these windows are tuned to the operating frequency of a radar system, resonant therewith, and as such, are able to reflect very strong pulses to the radar system.

A third type of interference is that resulting from the effects of radiation generated by friendly radar equipment.

Since, an adverse effect caused by interference or "jamming" usually results from some component in the radar system having its normal function impaired by the occurrence of a condition of saturation or maximum response therein, prior systems have attempted to eliminate or at least partially limit these saturation effects so that desired signals will not be obscured or prevented from coming through to a suitable indicator means.

To eliminate the detrimental effects due to the type of interference resulting from enemy jamming or interference due to friendly radar sets, most prior systems have made use of the expedient of employing a high pass type of filter circuit in the second detector output stage of a radar receiver.

For overcoming the aforestated extensive "mass type of interference" the prior art has disclosed four usual types of circuits which, however, almost always necessitate their use in combinations of two or three if they are to be used to advantage. These four circuits operate in different parts of the radar receiver so as to eliminate interference at these points.

One such circuit is known as a sensitivity time control circuit and is so adapted as to render the gain of the intermediate frequency stages of a radar receiver proportional to the range of the target.

A second circuit employs a system of back biasing and is so constructed as to decrease the grid voltage of particular stages in the radar receiver.

A third type of control or circuit arrangement provides for filtering action developed through the use of a fast time constant coupling the detector stage of a radar receiver to its first video stage. In this manner the direct current as well as the low frequency components are removed.

Finally, a fourth type of circuit is employed to bias a detector stage of the radar receiver in such manner and sufficiently as to keep high frequency components of the "jamming" signals from saturating subsequent video stages.

The present invention, however, besides employing the above-stated means for decreasing interference signals caused by various types of "jamming" or interference, provides among other features, novel apparatus and methods for changing the widths of the transmitter and range "gate" pulses of electromagnetic energy at will and simultaneously therewith changing the receiver band width to suit.

In this manner increased range discrimination is effected between a target and nearby objects as well as reducing the interference from other radar sets, whether friendly or enemy, operating at approximately the same frequency.

A prime object of the present invention, therefore, is to provide means for reducing unwanted reflection signals of electromagnetic energy emanating from undesired targets.

A further object of the present invention is to increase the operating efficiency of a pulse radar tracking and detecting system.

Another object of the present invention is to provide means for discriminating between unwanted and wanted signals in a radar tracking and detecting system.

Yet another object of the present invention is to provide means for simultaneously altering the transmitted pulse width, range gate width and receiver band width of a radar system.

Another object of the invention is to provide interference eliminating circuits for use in object detecting and tracking systems.

A further object of the invention is to provide improved apparatus and instrumentalities adapted for use in realizing the above objects and also adapted for use in other fields.

Figure 3:
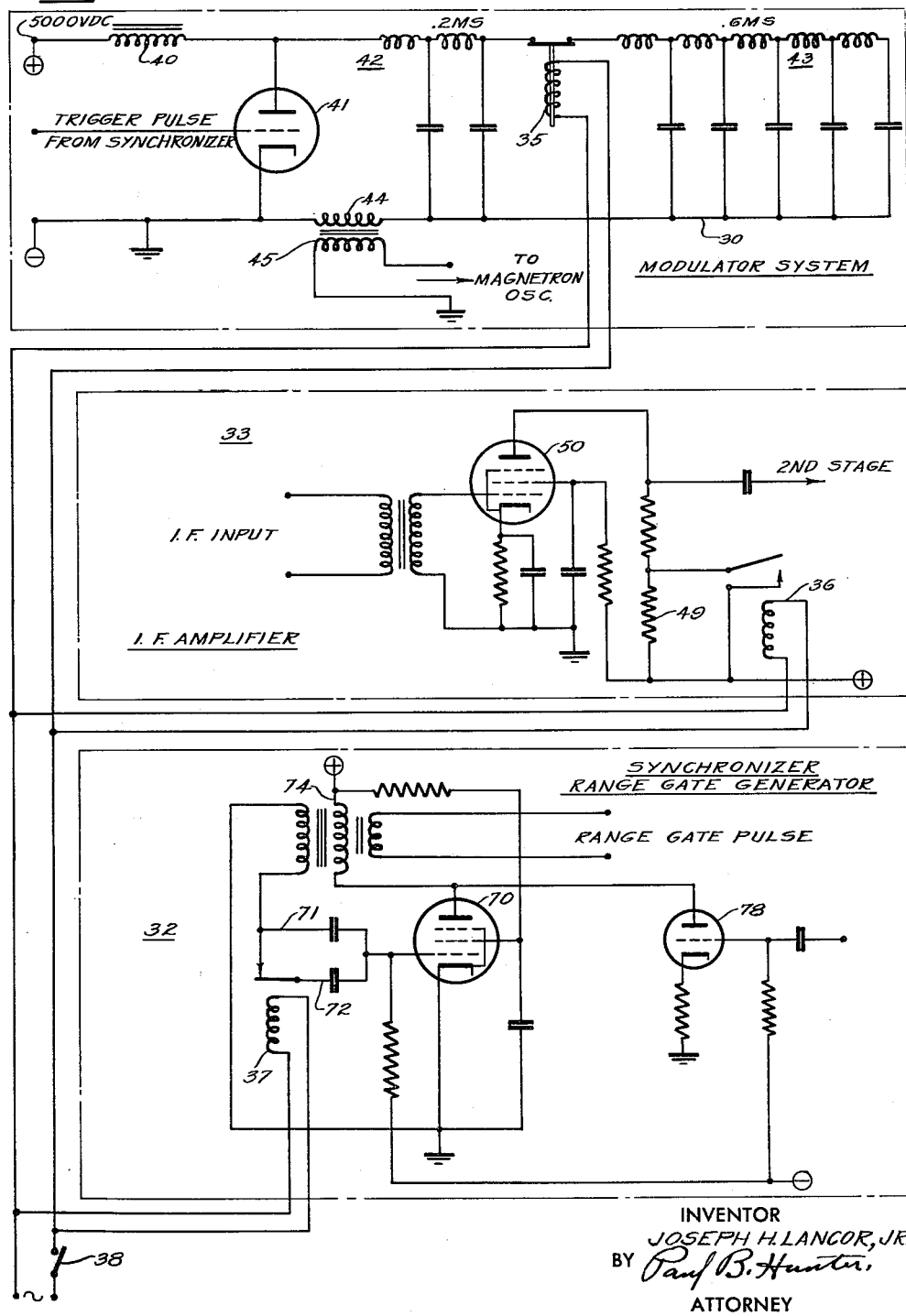

A better understanding of this invention will be afforded by the following detailed description considered in connection with the accompanying drawings, in which, FIG. 1 is a combined schematic and block diagram used to generally illustrate the operation of an object detecting and tracking system;

FIG. 2 is a block diagram used to illustrate the circuit arrangements used in the present invention for reducing the effect of undesired radio signals;

FIG. 3 is a simplified schematic diagram illustrating the electrical circuit arrangements used in the invention as exemplified in FIG. 2 and as used for reducing the effect of undesired radio signals; and FIGS. 4A and 4B are graphs used to illustrate the effects of band width changes in the intermediate frequency stages of the radar receiver utilized in the present invention on the receipt of narrow and wide pulses of electromagnetic energy.

Like reference characteristics are utilized throughout the drawings to designate like parts or components.

The general function of all object detecting and tracking systems employed at very high frequencies, is to determine the position of objects or targets by searching the surrounding environment, to ascertain the presence of such targets or objects, present representations of such objects visually on an indicating device, and to continuously track a selected target or group of targets so that such targets may be held within a line of sight at all times.

In the process of target selection and tracking, it is thus highly desirable that unwanted radio signals, whether inadvertent or premediated by eliminated in order that the aforesaid functions of the system be effectively uninhibited.

Thus, the present invention concerns itself with increasing the efficiency of a pulse radar tracking and detecting system by substantially reducing unwanted radio signals caused by electromagnetic energy radiation arising from sources external to the pulse radar system itself and to the object being detected.

To carry out this intention the present invention simultaneously changes the width of the transmitted pulse of electromagnetic energy, the width of the gate pulse used in tracking a desired target, and the width of the band of frequencies enabled to be passed by the intermediate frequency stages of the radar receiver utilized in the system.

Referring now to FIG. 1 there is shown a combined simplified schematic and block diagram of an object detecting and tracking system wherein the path of the signal pulse radiated to a detected object and its reflection therefrom to the system is traced through various components thereof.

Electromagnetic pulses of energy having a pulse width of 0.8 microsecond and a peak power of approximately 250 kilowatts are developed in the modulator stage 31 of radar transmitter 11. These pulses of energy are directed to microwave antenna 12 via coaxial transmission line 13 and are radiated into space as discrete pulses of electromagnetic energy.

These radiated pulses of energy impinge a target and have portions thereof returned to the radar system as echo reflection signals. Antenna 12 functioning now as a receiving antenna directs these received echo signals to radar receiver 14 via transmission line 18.

Radar receiver 14 amplifies these target echoes and in turn routes the amplified signals to, (a) the antenna positioning unit 15, (b) the range unit 16, and (c) the presentation and control unit 17 of the radar system.

In order to prevent transmitted pulses of electromagnetic energy from interfering with the returned echo pulses, a pulse repetition rate of 1100 per second has been selected so that a separation time interval of 900 microseconds is obtained during which returning echo signals can be received by the antenna without interfering with transmitted pulses of energy.

In order to prevent damage to receiver 14 by the high powered transmitted pulses, and to allow the target echoes to enter the receiver 14, an electronic switching device 29, known to those skilled in the art as a "T/R box," is used.

In searching for targets, antenna assembly 19 comprising antenna 12 and parabolic reflector 20, is rotated in azimuth and tilted in elevation in order to cover the space surrounding the radar system.

Antenna 12 is a dipole rotating at any desirable speed, which in the present invention has been selected as 3600 revolutions per minute. By means of parabolic reflector 20, radiated pulses of microwave energy are focused in a highly directive manner. Dipole antenna 12 is positioned so that this focusing beam of energy is electrically displaced from the center axis of the parabola 20 so as to scan a conically-shaped area.

When a target is observed, antenna assembly 19 is automatically driven until the reflection response received from the target is maximum. At such time antenna assembly 19 is on target and its position gives the azimuth and elevation angles of the target as indicated on proper meters in control unit 17. If the beam is displaced from the target, returning echo signals develop error voltages in antenna positioning unit 15 which drive the antenna assembly 19 so that antenna 12 is correctly focussed.

On receipt of the reflection signals by radar receiver 14, they are amplified and forwarded to antenna position unit 15, range unit 16 and to the presentation—control unit 17 of the radar system.

The presentation-control unit 17 of the radar system comprises cathode ray tubes and their accompanying circuits which visually represent the received signals for operational guidance of the system.

The synchronizer unit 26 of the radar system correlates the action of all the separate units by sending out proper triggering signals thereto and also establishing the proper selector or "gate" pulse widths which are used for tracking a desired target. In the present system, the normal use of the gate pulse is established at a width of approximately .8 microsceond.

Associated computer 27 and data transmission units 28 are employed with the radar system so as to enable the use, positioning and control of ordnance therewith.

Since the prime purpose of a radar object detecting and tracking system is to search the surrounding environment until a target or object is detected and then to track said target or object, it is necessary when such an object is detected that the echo signals reflected therefrom be received by the radar system without unnecessary disturbances.

Of course, in time of war, as a matter of strategy, enemy radar sets are continually attempting to set up interference patterns which will defeat this intention. In order to reduce such interference effects, as well as those caused by surrounding environment, there is disclosed in FIG. 2 means for overcoming such interference and thus to substantially increase the efficiency of such radar systems.

Coincidentally, in the transmitter unit 11, in receiving unit 14, and in synchronizer unit 26 of the radar system, adjustments are made in (a) the pulse forming network 30 of the modulator 31, in (b) the gate forming network 32 of synchronizer 26, and in (c) the first intermediate frequency amplifier circuits 33 of receiver 14, respectively, by means of relays 35, 36, 37 included therein and as activated by a discriminator switch 38. Specifically the transmitter and gate pulses are narrowed and the receiver-bandwidth is increased as will be more fully described.

As shown in FIGS. 2 and 3 relays 35, 36 and 37 change the width of the transmitter pulse formed by pulse network 30, the band width of the first intermediate frequency stage amplifier 33 of receiver 14, and the width of the "gate" pulses established by gate network 32 in the synchronizer 26 simultaneously so as to increase the discrimination against unwanted signals.

In FIG. 3 there is shown a simplified schematic diagram of the electrical network represented by the blocks in FIG. 2 of a particular embodiment of the invention.

As stated, under normal conditions without jamming or interference signals, the pulse width of the system has been established as .8 microsecond. This pulse width is determined by pulse forming network 30 in modulator 31 of transmitter 11. However, when discriminator switch 38 is closed, a narrow pulse width of .2 microsecond is obtained by opening relay 35 of pulse forming network 30.

A 5000 volt direct current voltage pulse coming from the high voltage power supply (not shown) enters modulator 31 comprised of charging choke 40, a thyratron tube 41 and sections 42 and 43 of pulse forming network 30.

Pulse forming network 30 charges up until thyratron 41 is fired by trigger signals spaced 900 microseconds apart coming from synchronizer 26. The pulse forming network 30 then discharges through the primary coil 44 of pulse transformer 45 delivering approximately —4500 volts thereto.

Thyratron 41 is a gas-filled triode which operates as an electronic switch. When thyratron 41 is fired by a trigger pulse coming from synchronizer 26 the voltage across network 30 drops to almost zero. The pulse width of the pulses delivered to the primary of coil 44 is thus determined by the two sections 42 and 43 of pulse forming network 30. Section 43 thereof is responsible for a pulse width of .6 microsecond.

When sections 42 and 43 are in the circuit, they are connected in series by means of relay 35. However, when the discrimination switch 38 is closed the .6 microsecond network section 43 is removed from circuit 30 by relay 35 and a pulse of .2 microsecond is delivered to the magnetron by means of pulse transformer 45.

Pulse transformer 45 has a step-up ratio of 4.5 to 1 and its input of approximately —4500 volts delivers approximately —20,000 volts to the magnetron oscillator.

Concurrently, when switch 38 is closed, relay 36 in the plate circuit of the first intermediate frequency amplifier 33 of receiver 14 is closed shorting out resistor 49 therein. This reduces the plate load resistance of amplifier 50 and changes the band width of the amplifier from 1 megacycle to 10 megacycles.

At the same time discriminator switch 38 activates relay 37 in the gate forming network 32 of synchronizer unit 26. As seen in FIG. 1, one of the outputs from receiver 14 is directed to range system 16. The function of range system 16 is to measure the range in yards to the target and includes electronic circuits for producing a range error signal so as to substantially continuously determine the range of the target.

This is done by developing "gate" or selector pulses in synchronizer unit 26 and directing these pulses to range system 16, which pulses are placed beneath the target echoes obtained from radar receiver 14. These target echoes are maintained in the center of the gate pulses by means of electronic or mechanical circuits, which in the present invention includes a system of phase shifters. The "gate" pulses so utilized must therefore have approximately the same pulse width as the echoes from the target so as to maintain errors in tracking at a minimum.

In FIG. 3 the periodicity of blocking oscillator 70, and hence the width of the range gate pulses generated by the blocking oscillator 70 is determined, in part, by the charge and discharge of capacitors 71 and 72 included in the grid circuit of oscillator 70. It is noted that the synchronization of oscillator 70 is obtained through the use of a trigger tube 78.

Capacitor 71 has a value of 100 M.M.F. while capacitor 72 has a value of 500 M.M.F. Depending, then, upon the values of the capacitance included in the grid circuit of oscillator 70 is the output width of the "gate" pulses taken from tertiary winding 73 of plate pulse transformer 74.

When relay 37 is activated capacitor 72 is effectively removed from the grid circuit of oscillator 70 thereby increasing the periodicity of the oscillator 70 but narrowing the width of the output gate pulse in accordance with the narrowed echo return signal.

By a simultaneous adjustment in the width of the transmitter and range "gate" pulses, together with the widening of the band pass of the first intermediate frequency stages of the radar receiver, the efficiency of the present system is greatly enhanced by enabling increased discrimination in favor of returning target echoes.

In FIG. 4A, the frequency band width of the first intermediate frequency amplifier stage of radar receiver 14 is shown as being altered from 1 megacycle to 10 megacycles. The following stages of intermediate frequency amplification always have a wide band pass, thus the band width of the first intermediate amplifier determines the response of the radar receiver to incoming echo signals. In FIG. 4B, the effect of the narrow band pass is distorting the narrow transmitter pulse 80' is shown as at 85. This is due to the inability of the narrow band width utilized by the amplifier to respond to the higher harmonics inherent in the narrow pulse 80'.

The greatly increased fidelity obtained by widening the frequency response of the intermediate frequency transformers utilized in the first intermediate amplifier stages of the radar receiver 14 is illustrated as by wave shape 86.

Although manual adjustment of the various pulse widths has herein been disclosed, it is not intended to restrict the operation of the system to this type of control, inasmuch as means and methods may be used herein for automatically substantially continuously controlling the several widths of the pulses.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Apparatus for use in a microwave object detecting and tracking system comprising transmitter means for generating pulses of electromagnetic energy having variable pulse widths and means for generating target range tracking pulses of varying width in accordance with the width of said pulses of electromagnetic energy.

2. Interference reduction apparatus for use in a microwave object detecting and tracking system comprising means for generating pulses of electromagnetic energy having variable pulse widths, means for altering the band width of an intermediate frequency amplifier in the receiver of said system and means for generating range pulses of varying width in accordance with the width of said generated transmitter pulses.

3. Interference reduction apparatus for use in a microwave object detecting system, comprising means for generating transmitted pulses of electromagnetic energy having variable pulse widths, said transmitter pulse generating means including a pulse forming network comprising a pair of multiple inductance, capacitance sections connected in series, and means for concurrently altering the band width of an intermediate frequency amplifier in the receiver of said system in accordance with the width of said generated pulses.

4. Interference reduction apparatus for use in a microwave object detecting system, comprising means for generating transmitted pulses of electromagnetic energy having variable pulse widths, said means including a pulse forming network comprising a plurality of sections connected in series, the first of which sections is included in said network at all times, and means for concurrently altering the band width of an intermediate frequency amplifier of the receiver of said system in accordance with the width of said transmitted pulses.

5. Interference reduction apparatus for use in a microwave object detecting and tracking system comprising means for generating transmitter pulses of electromagnetic energy having variable pulse widths, means for concurrently altering the band width of the intermediate frequency amplifiers in the receiver of said system, and means for generating range pulses of variable width, said range pulse generating means including a network of parallel capacitors for controlling the width of said pulses in accordance with the width of said transmitted pulses.

References Cited in the file of this patent

UNITED STATES PATENTS

| | | |
|---|---|---|
| 2,266,401 | Reeves | Dec. 16, 1941 |
| 2,273,193 | Heising | Feb. 17, 1942 |
| 2,403,527 | Hershberger | July 9, 1946 |
| 2,410,736 | Hoisington | Nov. 5, 1946 |
| 2,423,024 | Hershberger | June 24, 1947 |
| 2,435,960 | Fyler | Feb. 17, 1948 |
| 2,568,441 | Fyler | Sept. 18, 1951 |

FOREIGN PATENTS

| | | |
|---|---|---|
| 609,537 | Great Britain | Oct. 1, 1948 |